Sept. 11, 1951     Z. W. WILCHINSKY     2,567,587
METHOD AND APPARATUS FOR MEASURING CAPACITANCE
Filed Dec. 10, 1945
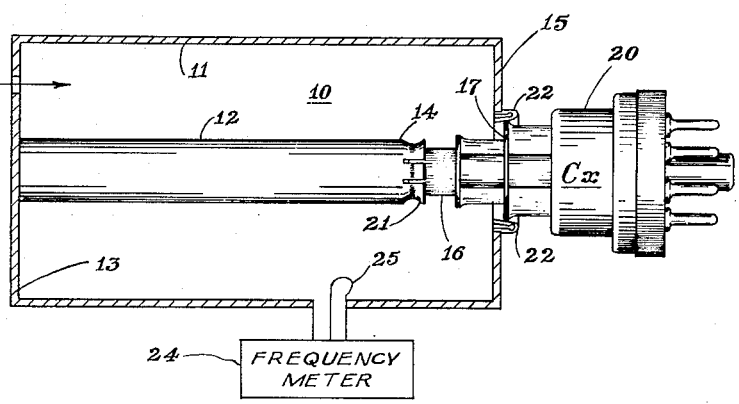
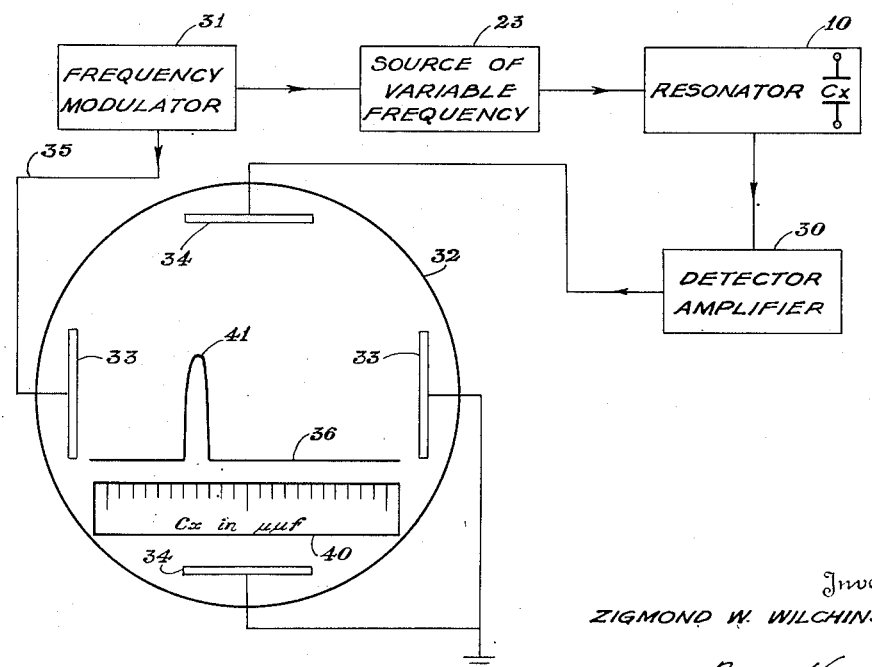
Inventor
ZIGMOND W. WILCHINSKY
By M. O. Hayes
Attorney Patented Sept. 11, 1951

2,567,587

UNITED STATES PATENT OFFICE 2,567,587

METHOD AND APPARATUS FOR MEASURING CAPACITANCE

Zigmond W. Wilchinsky, Washington, D. C., assignor, by mesne assignments, to the United States of America as represented by the Secretary of the Navy Application December 10, 1945, Serial No. 634,105

4 Claims. (Cl. 175—183)

This invention relates to a means and method for quickly and easily measuring very small differences in capacitance.

It is an object of this invention to provide a method and apparatus whereby very small magnitude differences of capacitance may be quickly and easily measured.

It is another object of this invention to provide a means and method whereby small difference values of capacitance may be quickly and accurately measured by loading a circuit with capacitance and measuring the difference between the resonant frequency of the circuit when loaded with unknown capacitance and when loaded with known capacitance, the frequency difference being a simple function of the capacitance difference being measured.

It is a further object of this invention to measure a small difference in capacitance by applying energy of resonant frequency to a resonator loaded with known capacitance, measuring this frequency, loading the resonator with capacitance to be measured, changing the frequency applied to the resonator until resonance is again obtained, and measuring the new resonant frequency. The difference in the two frequencies is a simple function of the difference in capacitance between the second mentioned and first mentioned capacitance.

It is an additional object of this invention to provide a method and apparatus whereby an unknown value of capacitance may be quickly and easily measured by insertion into a resonator, with the capacitance value being instantly readable on a cathode ray tube indicator.

In accordance with these objects and with other objects which will become apparent in the following specification, this invention will now be described with reference to the drawing, in which, Fig. 1 shows, in partially symbolic form, a simple apparatus embodying this invention and by means of which the method of this invention may be practiced; and Fig. 2 shows a more specific form of apparatus embodying the principles of this invention and by means of which the method of this invention may be carried out.

This invention concerns the idea of applying energy of resonant frequency to a circuit containing a known capacitance, replacing the known capacitance with a capacitance to be measured, changing the frequency of the energy applied until resonance is again obtained, and measuring the difference in the resonant frequency of the circuit under the two conditions of loading. The difference in frequency is a simple function of the difference between the two values of capacitance inserted into the circuit.

Particular values, as examples, will be cited below in connection with the description of Fig. 2 to show that changes in capacitance as small as .005 micromicrofarad may be measured by use of frequencies in the neighborhood of 1000 megacycles.

A more specific embodiment of this invention is particularly suitable where it is desired to measure quickly small capacitance difference in an electrical component; as for example inter-electrode capacitance in a radio tube, where the tubes must be checked as they emerge from a production line, in order to be sure that the interelectrode capacitance lies within the manufacturing tolerance. For this purpose, the frequency of the energy applied to the resonant circuit, or resonator, is periodically swept through a continuously variable range. The horizontal sweep of a cathode ray tube indicator is synchronized with the sweep periodicity of the frequency modulating source referred to above. Detecting means are used to apply rectified output from the resonator to the vertical plates of the cathode ray tube. Thus, as the swept frequency of the energy applied to the resonator passes thru the resonant frequency of the capacitance-loaded resonator, an indication will appear on the cathode ray tube opposite the point on the horizontal scale of the tube corresponding to the resonant frequency. Since frequency and capacitance are related, the horizontal scale of the indicator may be calibrated in terms of the unknown capacitance, whereby a direct reading of capacitance is quickly and accurately obtained.

Referring to Fig. 1, a circuit is shown in the form of a concentric transmission line section 10, having outer conductor 11 and inner conductor 12. The section is short-circuited at one end by an annular conducting member 13 and is open circuited at the other end, where inner conductor 12 terminates at point 14. A capacitance $C_x$, in the form of a lighthouse, or 2C43 tube, is connected between end 14 of inner conductor 12 and the end of outer conductor 11 represented by annular plate 15. In the example shown, capacitance between anode and grid of the tube 20 is loaded on the end of transmission line section 10, inasmuch as terminal 16 of the tube is connected internally to the anode, while annular terminal 17 is connected to the grid, in the well known construction typical of the lighthouse type of tube. Electrical connection between end 14 of inner conductor 12 and terminal 16 of tube 20 is provided by spring fingers 21. Electrical connection between annular terminal 17 of tube 20 and plate 15 of outer conductor 11 is provided by spring fingers 22.

Electrically, the apparatus thus far described constitutes a section of low-loss transmission line, short-circuited at one end and open-circuited at the other, and adapted to receive, across the open-circuited end thereof, a small capacitance to be measured.

A source of variable frequency energy, symbolized by box 23, is connected in any desired manner so as to apply energy to the transmission line section 10. Line section 10 may even form an actual operating part of a tunable oscillator. For example, section 10 may constitute a tuned circuit connected between anode and grid of a conventional high frequency oscillator. In order to measure the resonant frequency of line section 10, a frequency meter 24 is connected thereto by means of output coupling loop 25. It will be understood that frequency meter 24 functions to detect, or rectify, the energy picked up in loop 25 and to measure and indicate the principal frequency component of the energy existing in line section 10. Line section 10 may, if desired, be any form of resonator circuit capable of being loaded with, or to which may be applied, an unknown capacitance, at a point in the circuit where the loading is effective to vary the resonant frequency of the resonator circuit.

The apparatus of Fig. 1 is used in the following manner. Alternating current energy from source 23 is applied to line section 10, loaded at its open circuited end 14—15 with a known capacitance having a value of the same order of magnitude as that of the unknown capacitance $C_x$, to be measured. The frequency of the energy from source 23 is varied until resonance is indicated by frequency meter 24. The resonant frequency is noted. The known capacitance is then replaced by unknown capacitance $C_x$, as shown, and the frequency of source 23 is again varied until resonance is reestablished. This frequency is also measured and noted. The difference, $\Delta f$, between the two frequencies is related to the difference, $\Delta C$, between the unknown capacitance $C_x$ and the known capacitance $C$, by the following relation:

$$\frac{\Delta C}{C} = -\left(1 + \frac{4\pi x}{\text{sine } 4\pi x}\right)\frac{\Delta f}{f}$$

where, $C$=known capacitance originally applied across line
$\Delta C$=difference between $C_x$ and $C$
$f$=frequency of energy originally applied to line
$\Delta f$=difference in resonant frequency with line loaded by $C_x$ and by $C$.
$x$=length of line, measured in wave lengths of oscillations in line at frequency $f$.

A more specific embodiment of the apparatus and method of this invention is illustrated in Fig. 2 wherein 10 designates the resonator; 23, the source of variable frequency energy; and 30, a detector-amplifier serving part of the function provided by frequency meter 24 in the apparatus of Fig. 1. In addition, there is shown a frequency modulator, represented by box 31, effective to cause energy source 23 to sweep through a continuously variable band of frequencies, and a cathode ray tube indicator 32, having horizontal deflection plates 33 and vertical deflection plates 34.

In the operation of the apparatus of Fig. 2, frequency modulator 31 sweep modulates source 23 periodically through a band of frequencies. Frequency modulated energy from 23 is applied to resonator 10, loaded with unknown capacitance $C_x$. Detector amplifier 30 applies rectified output from resonator 10 to vertical deflection plates 34 of indicator 32. A connection 35 applies a sweep voltage to horizontal deflection plates 33 of indicator 32 so that the horizontal sweeping of the indicator beam 36 is synchronized with the sweep modulation applied by modulator 31 to energy source 23.

A specific use of the apparatus of Fig. 2 is as follows: Assume that a particular value of capacitance, C, is the correct manufacturing value desired in the component to be tested as it comes off the production line. Variable frequency source 23 is so adjusted that it is swept by modulator 31 through a band of frequencies, the mid-point of which is the resonant frequency of resonator 10 with capacitance C loaded thereon. The extreme ends of the swept frequency band are chosen to correspond to the extremities in manufacturing tolerance permissible in capacitance value for $C_x$. Therefore, the left hand end of the indicator beam 36 may be made to correspond with the high frequency point of the frequency modulator sweep, corresponding to the lowest permissible value for $C_x$. The mid-point in the horizontal scale 40 may then correspond to the optimum value for $C_x$. The right hand end of sweep beam 36, corresponding to the low frequency end of the modulating sweep frequency controlled by modulator 31, will correspond with the higher permissible value for $C_x$.

The method of use of the apparatus of Fig. 2 is now apparent. An electrical component, coming from the production line and having a capacitance to be tested, is applied to resonator 10 so that the capacitance loads the resonator in the manner hereinbefore described. Beam 36, sweeping periodically and rapidly across the face of indicator 32, will have therein a pip 41 produced by the rectified resonant frequency energy applied to indicator 32 through detector-amplifier 30. Pip 41 will appear opposite the point on horizontal scale 40 corresponding to the value $C_x$ of the capacitance loaded across the resonator. In this manner, unknown capacitance, for example the inter-electrode capacitance of a lighthouse tube 20, may be quickly and easily applied to resonator 10; and a glance at indicator 32 will show the operator whether the capacitance lies within the permissible tolerance range, and if so the exact value of the capacitance.

A particular apparatus will now be described. Assume that capacitances having values of approximately two micro-microfarads are to be measured. Assume further that resonator 10 comprises a transmission line section, as shown in Fig. 1, having a characteristic impedance of 79.5 ohms and is made equal in length to ⅝ λ at a frequency of 1000 megacycles. Such a resonator will have a resonant frequency of 1000 megacycles when a capacitance of two micro-microfarads is loaded on the end. Assume that the manufacturing tolerance permissible for the capacitance is 2±0.1 micro-microfarads. According to the relation given hereinbefore, a frequency sweep of 1000±5.65 megacycles will correspond to loaded capacitance values of 2±0.1 micro-microfarads. Therefore, by causing frequency modulator 31 to sweep the frequency of energy source 23 between 994.35 and 1005.65 megacycles, pip 41 on indicator 32 will appear on the scale whenever $C_x$ has a value lying between 1.9 and 2.1 micro-microfarads.

The sensitivity of this method of capacitance measurement may be calculated by noting that, in the region of 1000 megacycles, differences in frequency as small as 25 kilocycles can be measured with known apparatus. This difference corresponds to a difference in capacitance of approximately .0005 micro-microfarad, the approximate sensitivity of the capacitance difference measurement method described herein.

The method of the present invention may also be used to measure capacitance change in a single given element, such as may result from heating or other change in ambient conditions. In this use the component is loaded on the line and the resonant frequency drift over a period of time is a measure of the drift in capacitance of the component.

Although I have shown and described certain specific embodiments of the invention, I am fully aware of the many modifications possible thereof. This invention is not to be restricted except insofar as is necessitated by prior art and the spirit of the appended claims.

What is claimed is:

1. Apparatus for quickly determining whether the inter-electrode capacitance of a vacuum tube falls within desired limits comprising a resonant circuit having a vacuum tube socket connection, a source of variable frequency energy coupled to said resonant circuit, modulating means coupled to said source of variable frequency energy for causing the frequency of said energy source to sweep a band of frequencies, the upper limit of said frequency band being the resonant frequency of the resonant circuit loaded with a vacuum tube having the maximum allowable tolerance for inter-electrode capacitance below the optimum and the lower limit of said frequency band being the resonant frequency of the resonant circuit loaded with a vacuum tube having the maximum allowable tolerance for inter-electrode capacitance above the optimum, means coupled to the resonant circuit for detecting the energy output therefrom, a cathode ray tube having horizontal and vertical beam deflecting means, means coupling the output of said detecting means to one of said beam deflecting means, means coupled to the other beam deflecting means for producing a beam trace which sweeps over a given area of the cathode ray tube screen, said means including means for synchronizing said beam trace so that the beginning and end thereof coincides with the instants of time at which the frequency of said energy source reaches the respective extremities of said band of frequencies, whereby when a vacuum tube is inserted in the socket connection, the appearance of a pip on the cathode ray tube screen quickly indicates that the inter-electrode capacitance of the vacuum tube is within the maximum allowable tolerance.

2. Apparatus for quickly determining whether the inter-electrode capacitance of a vacuum tube falls within desired limits comprising a resonant circuit having a vacuum tube socket connection, a source of variable frequency energy coupled to said resonant circuit, a modulating means coupled to said source for causing the latter to sweep a band of frequencies, the limits of said band corresponding to the resonant frequencies of the circuit loaded with a vacuum tube having the maximum allowable tolerance in either direction from the optimum inter-electrode capacitance, means coupled to the resonant circuit for detecting the energy output therefrom and an energy-indicating instrument coupled to said detecting means, whereby an indication on said instrument indicates that the inter-electrode capacitance of the vacuum tube tested falls within the desired limits.

3. The method of determining whether an unknown reactance falls within desired tolerance limits comprising the steps of determining the resonant frequency of a test circuit loaded with a known reactance, producing a range of signal frequencies extending above and below the resonant frequency of the circuit loaded with the known reactance, the limits of said range of frequencies corresponding to the resonant frequencies of said test circuit when loaded by an unknown reactance having the maximum tolerance allowed for the unknown reactance in either direction from the optimum reactance desired, substituting the unknown reactance for the known reactance in the test circuit, applying the range of frequencies to the test circuit loaded with the unknown reactance and indicating whether the resonant frequency of the test circuit loaded with the unknown reactance falls within said range of frequencies.

4. The method of determining whether an unknown reactance falls within desired tolerance limits comprising the steps of determining the resonant frequency of a test circuit loaded with a known reactance, producing a range of signal frequencies extending above and below said determined resonant frequency, one limit of said range of frequencies corresponding to the resonant frequency of the test circuit loaded with a reactance having a maximum allowable tolerance in one direction and the other limit of said frequency range corresponding to the resonant frequency of the test circuit loaded with a reactance having a maximum allowable tolerance in the opposite direction, manually substituting an unknown reactance for the known reactance in the test circuit, applying the range of frequencies to the test circuit loaded with the unknown reactance, and indicating whether the resonant frequency of the test circuit loaded with the unknown reactance falls within said range of frequencies.

ZIGMOND W. WILCHINSKY.

REFERENCES CITED

The following references are of record in the file of this patent:

UNITED STATES PATENTS

| Number | Name | Date |
|---|---|---|
| 2,145,483 | Jacob | Jan. 31, 1939 |
| 2,252,058 | Bond | Aug. 12, 1941 |
| 2,320,175 | Dennis et al. | May 25, 1943 |
| 2,358,462 | Mahren | Sept. 19, 1944 |
| 2,408,927 | Gurewitsch | Oct. 8, 1946 |

OTHER REFERENCES

Radio World, May 8, 1931, pages 16–17.
Wireless World, February 1944, pages 37–40.